TRANSMISSION SYSTEM FOR TELEVISION SIGNALS

Filed Jan. 26, 1956 3 Sheets-Sheet 1

INVENTOR
JOHAN HAANTJES
KEES TEER

TRANSMISSION SYSTEM FOR TELEVISION SIGNALS

Filed Jan. 26, 1956 3 Sheets-Sheet 2

INVENTOR
JOHAN HAANTJES
KEES TEER

INVENTOR
JOHAN HAANTJES
KEES TEER

United States Patent Office 2,904,628

Patented Sept. 15, 1959

2,904,628

TRANSMISSION SYSTEM FOR TELEVISION SIGNALS

Johan Haantjes and Kees Teer, Eindhoven, Netherlands, assignors, by mesne assignments, to North American Philips Company, Inc., New York, N.Y., a corporation of Delaware Application January 26, 1956, Serial No. 561,627

Claims priority, application Netherlands February 10, 1955

3 Claims. (Cl. 178—6)

The invention relates to a transmission system for signals corresponding to television images or similar images which are scanned linewise, in which moreover at least one auxiliary carrier wave, modulated by signals also corresponding to similar images, is transmitted, and also relates to such a system in which no information need be transmitted from the transmitter to the receiver for the demodulation of the signals modulated on the auxiliary carrier wave.

Such systems may be used for colour television. An example of such a system is one in which a signal of large bandwidth is transmitted continuously, whilst two other signals of smaller bandwidth, modulated on the same auxiliary carrier wave, are transmitted alternately. A further example is a system in which a signal of large bandwidth is transmitted continuously, whilst two other signals of smaller bandwidth modulated each on a separate auxiliary carrier, are transmitted also continuously.

In such systems it suffices at the receiver end for the demodulation of the signals modulated on an auxiliary carrier to use a bandpass filter and a detector circuit without the need for further information from the transmitter at the detector. This information is, on the contrary, required, if the two signals of smaller bandwidth are modulated in quadrature on an auxiliary carrier. For the detection the receiver then requires two auxiliary oscillations, the frequencies of which correspond to those of the auxiliary carrier, a particular phase relationship prevailing between these auxiliary oscillations and the auxiliary carrier. In order to obtain the said frequency equality and the said phase relationship between the auxiliary oscillations produced in the receiver and the auxiliary carrier produced in the transmitter the transmitter emits further information about this auxiliary carrier. In a known system this further information consists in a reference signal (colour burst), the frequency of which corresponds to that of the auxiliary carrier, a fixed phase relationship prevailing between this reference signal and the auxiliary carrier produced in the transmitter. This reference signal is emitted periodically, i.e. during the back porches of the line synchronizing pulses.

Such reference signals with the correct frequency and the correct phase are not required for the demodulation of the auxiliary carrier in the systems to which the invention applies. In accordance with the invention it is, however, to be preferred to transmit simultaneously reference signals, be it for quite different reasons, whilst, on the other hand, a correct phase relationship between these reference signals and the auxiliary carriers produced in the transmitter is quite irrelevant.

This reason will be explained more fully hereinafter. A colour television transmitter emits, with the aid of a main carrier or without it, a signal of large bandwidth and, for example, two signals of smaller bandwidth modulated each on one auxiliary carrier. The signal of large bandwidth may be a brightness signal and the two signals of smaller bandwidth may be colour signals. The frequencies of the auxiliary carriers lie either outside the frequency of the band of the signal of large bandwidth or inside this frequency band, where the higher frequencies of the signal of large bandwidth lie. It is known that the signals to be finally fed to the picture tube or tubes are, as a rule, formed by combining in a particular ratio the three signals thus transmitted. For a true reproduction of the scene converted into television signals at the transmitter end it is, of course, desirable for the amplitudes of the three transmitted signals to maintain their same ratio to one another at the beginning and at the end of the transmission path. If it is assumed that the scene to be reproduced is a white plane and that, for some reason or other the amplitude of the colour signal relating to the blue light components of the scene to be reproduced is reduced to zero, the image finally reproduced at the receiver end will represent a yellow plane. The fact that the signal relating to a colour component is completely suppressed, is, of course, an extreme case, but it will be obvious that any linear distortion in the transmission path, for example selective fading and frequency-dependent reflection in the case of a transmission with the aid of a carrier wave or a frequency-dependent transmission characteristic in the case of a transmission via a cable, does not contribute to the desired true reproduction.

The system according to the invention obviates these disadvantages and has the feature that a reference signal is supplied to the transmission path at the transmitter end during the occurrence of the backporches of the line synchronizing pulses, the amplitude of this reference signal being constant, its frequency corresponding at least substantially to the frequency of an auxiliary carrier and that at the receiver end provision is made of means which control the amplification factor of the transmission path within the receiver for the signal modulated on the auxiliary carrier in accordance with the amplitude of the associated reference signal.

The invention will be described more fully with reference to the figures of the drawing, in which Fig. 1 shows the frequency spectrum of three television signals in the transmission path with a system according to the invention, Fig. 2 shows the frequency spectrum of these three signals at the transmitter end.

Figure 1:
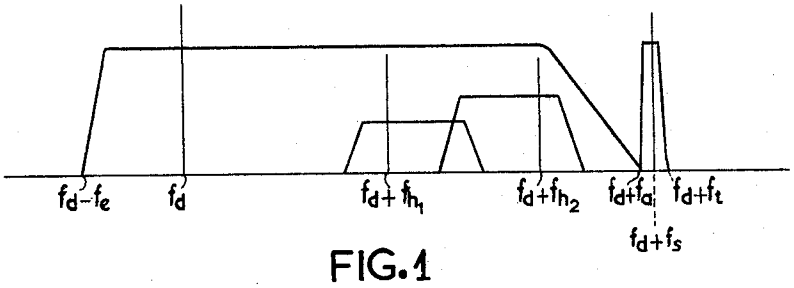
Figure 2:
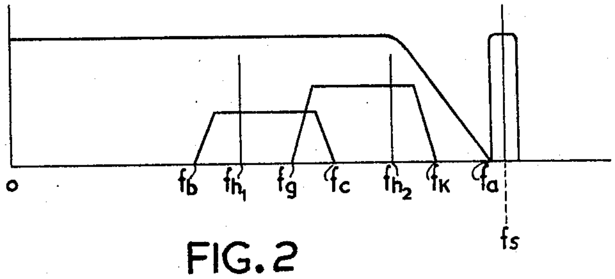

Fig. 1 shows an example of a frequency spectrum occurring in a colour television system according to the invention. Such a frequency spectrum, which extends from a frequency $f_d-f_e$ to a frequency $f_d+f_a$, is produced by the modulation of a carrier wave of the frequency $f_d$ by three signals, of which the first extends in a frequency band from 0 to $f_a$, the second extends from $f_b$ to $f_c$ and the third extends from $f_g$ to $f_k$, as indicated in Fig. 2, and the lower sideband being partly suppressed. The signal of large bandwidth may be, for example, the brightness signal; the second signal between the frequencies $f_b$ and $f_c$ is produced by modulating an auxiliary carrier of the frequency $f_{h1}$ by one of the colour signals; the third signal between the frequencies $f_g$ and $f_k$ is produced by modulating an auxiliary carrier of the frequency $f_{h2}$ by the other colour signal. The auxiliary carriers have, of course, such frequencies and, as the case may be, such phase differences that the relative interference of the various signals is substantially imperceptible to the eye at the reproduction.

Such a frequency spectrum is, of course, also produced by modulating a carrier of the frequency $f_d$ by the signal of large bandwidth and by modulating each of two carriers of frequencies $f_d+f_{h1}$ and $f_d+f_{h2}$ by a colour signal. Subsequent to demodulation in the receiver, however, the carriers $f_d+f_{h1}$ and $f_d+f_{h2}$ appear yet again in the video frequency spectrum of the signal of large bandwidth as auxiliary carriers of the frequencies $f_{h1}$ and $f_{h2}$.

It is known that, as a rule, the attenuation of the signal composed by the carrier modulated by the aforesaid three signals during the transmission path from the transmitter to the receiver will vary with time for reasons known per se. This may even be the case in parts of the transmission path, in the transmitter and in the receiver itself, owing to variations of tube characteristics and so on. These unwanted variations are, generally, compensated as far as possible by automatic gain control, the reference value being for example the amplitude of the line synchronizing pulses viewed from the black levels.

The frequency of these line synchronizing pulses, however, is comparatively low. If the aforesaid variable attenuation were independent of frequency, this would not be an objection; however, this attenuation appears to be dependent upon the frequency. A control on the line synchronizing pulses thus results in that only the frequencies in the proximity of the carrier, in this case, the low frequencies of the brightness signal, are maintained at the desired level. With a monochrome transmission this appears to be little disturbing in practice in view of the fact that the lower frequencies contribute most to a satisfactory result. In the case of colour television transmission by means of a system according to the invention the colour information is transmitted in a frequency range which is comparatively remote from the frequency range in which the said level control operates efficiently. It will be obvious that this may give rise to images which deviate materially from the images wanted.

In accordance with the invention, a reference signal is supplied to the transmission path at the transmitter end during the occurrence of the back-porches of the line synchronizing pulses, the amplitude of this reference signal being constant and its frequency corresponding at least approximately to the frequency of the associated auxiliary carrier. In the example shown such a reference signal will be supplied to the transmission path preferably for both the auxiliary carriers.

Figure 3:
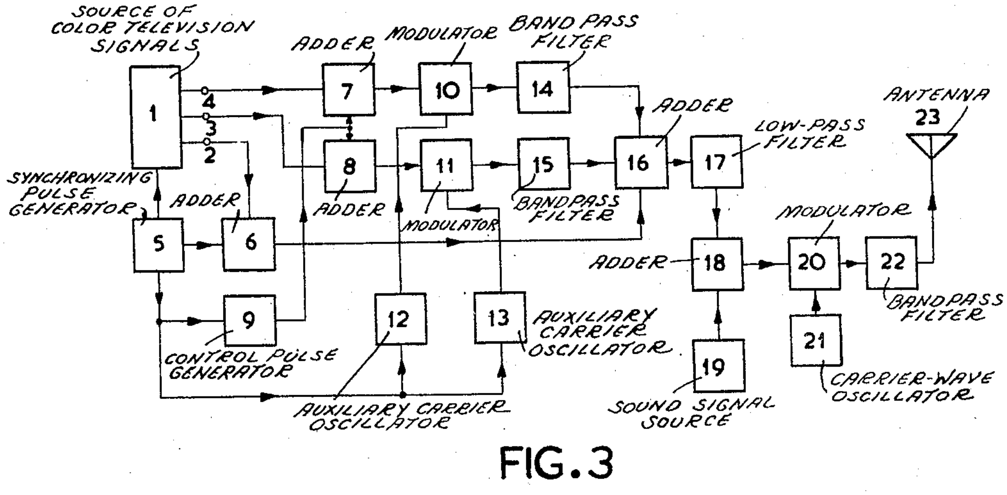
Fig. 3 shows diagrammatically an embodiment of a transmitter for use in a system according to the invention.

Fig. 3 shows a simplified embodiment of a transmitter for use in a transmission system according to the invention is a block diagram. The device 1 produces the brightness signal and the two colour signals at the outputs 2, 3 and 4. The device 1 comprises, to this end, the required recording cameras and the arrangement further required. In the device 5 the line and frame synchronizing pulses are produced. These pulses are supplied both to the device 1 to control the deflection means of the recording cameras and to the adding device 6, to which is also supplied the brightness signal occurring at the output 2.

Figure 4:
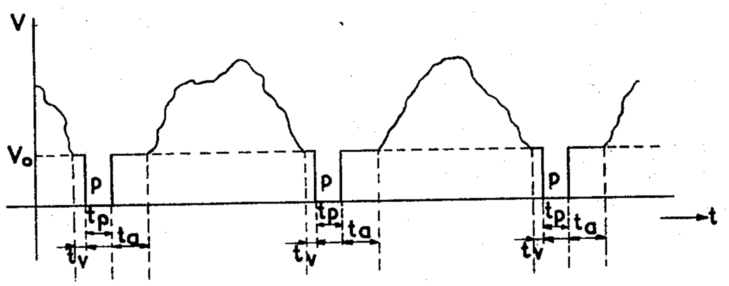
Figs. 4, 5, 6 and 7 show signal forms liable to occur in a system according to the invention.

The well-known shape of the signal thus occurring at the output of device 6 is indicated partly in Fig. 4 as a function of time. Reference $p$ designates herein the line synchronizing pulses, $V_0$ designates the black level. $V_0$ is a constant value. The line synchronizing pulses occur during the periods $t_p$, the front porches of the black level occur during the periods $t_v$ and the backporches of the black level occur during the periods $t_a$. The frame synchronizing pulses, the equalization pulses and so on are not shown in this figure.

Figure 5:
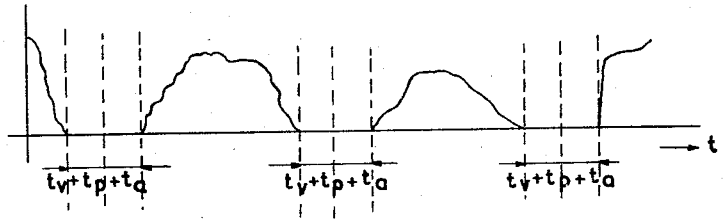

Fig. 5 shows the shape of an output signal occurring at the outputs 3 or 4. From the figure it is evident that the amplitude of such a signal is reduced to zero during the periods $t_v+t_p+t_a$. Each of the output signals occurring at the outputs 3 and 4 is supplied to an adding device 8 and 7 respectively, to which is also supplied the output signal of the device 9. The device 9 supplies control pulses of the same repetition frequency as the line synchronizing pulses, however they are narrower than the line synchronizing pulses and are, at the same time, delayed relatively to the latter, to an extent such that they occur during part of each of the periods $t_a$. The device 9 is preferably synchronized, for example, by the line synchronizing pulses from the device 5. The output signal of the adding devices 7 or 8 thus has the shape indicated in Fig. 6. The output signals of the devices 7 and 8 are supplied each to a modulator 10 and 11 respectively, to which is also supplied an auxiliary carrier of the frequency $f_{h1}$ and $f_{h2}$ respectively. These auxiliary carriers originate from the devices 12 and 13, which comprise oscillators suitable for this purpose. With a view to the aforesaid choice of the frequency and the phase difference thus occurring, if any, to avoid relative interference of the various signals during the reproduction, these devices 12 and 13 are controlled by the line- or frame synchronizing pulses from the device 5. The output signal of the modulator 10 is fed to a bandpass filter 14 having a pass range between the frequencies $f_b$ and $f_c$; the output signal of the modulator 11 is fed to a bandpass filter 15 having a pass range between the frequencies $f_p$ and $f_k$. The output signals of the adding device 6, the bandpass filter 14 and the bandpass filter 15 are combined in the adding device 16. The output signal of the adding device 16 thus has the shape indicated in Fig. 7. The signal portion occurring the periods $t_b$ is constituted by the superimposition of the pulses indicated in Fig. 6, modulated on the auxiliary carrier of the frequency $f_{h1}$ and these pulses modulated on the auxiliary carrier of the frequency $f_{h2}$. Similarly, the signal portion occurring during the periods $t_s$, is constituted by the superimposition of the brightness signal and the two modulated colour signals.

The output signal of the device 16 is then fed to a low-pass filter 17, having a cut-off frequency $f_a$, and then combined in the adding device 18 with the sound signal modulated on a carrier of the frequency $f_s$. This modulated sound signal initiates from a device 19, which comprises to this end the required microphones, amplifiers, modulators and so on.

The output signal of the device 18 may be transferred either to a transmission cable or, as is indicated in the figures, to a modulator 20, wherein the said signal is modulated on a carrier furnished by a device 21, the frequency of this carrier being $f_d$, after which the signal thus obtained is supplied to bandpass filter 22, having a pass range between the frequencies $f_d-f_e$ and $f_d+f_t$ (vide Fig. 1) and then to a transmitter aerial 23.

Figures 8, 9:
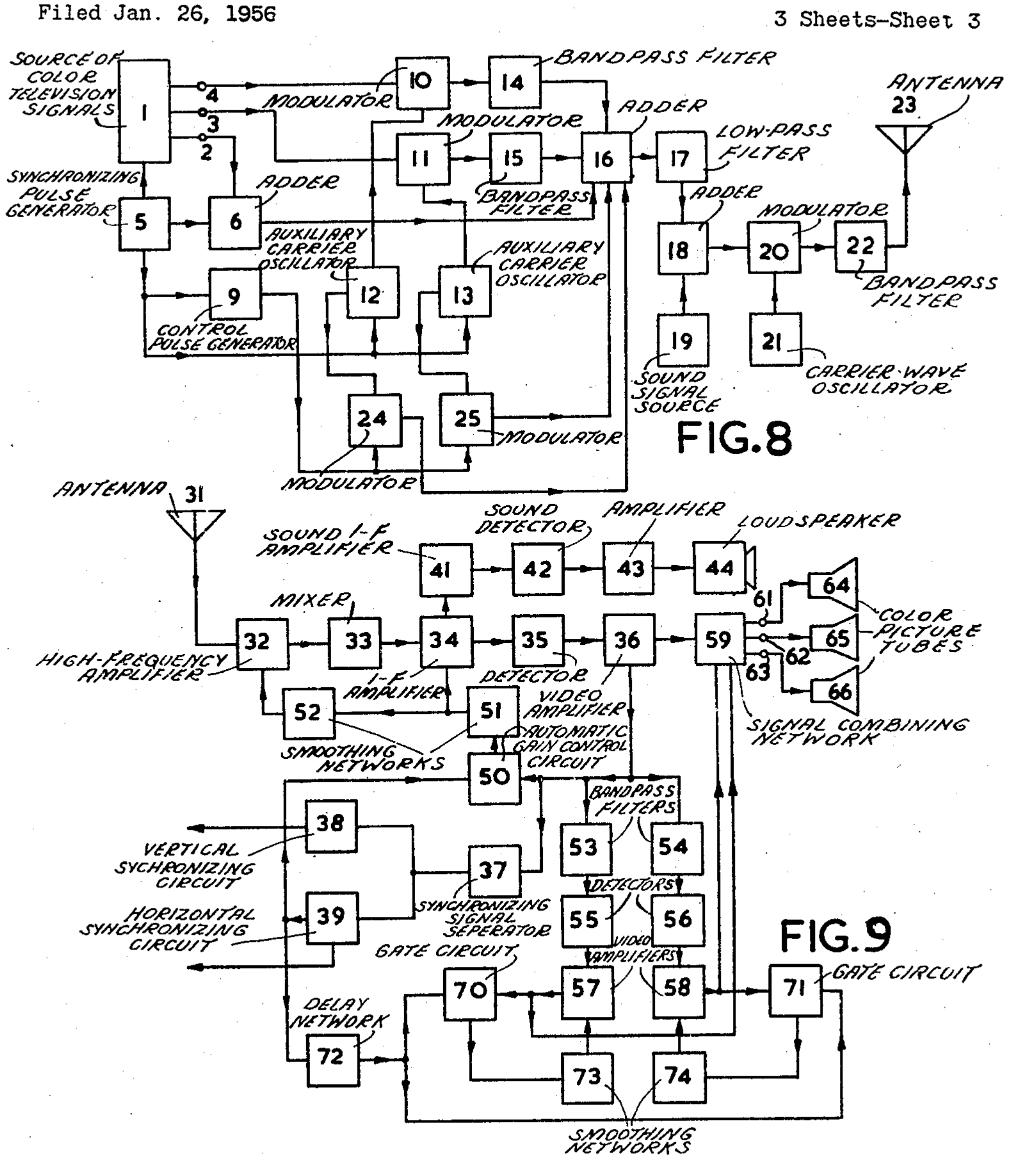
Fig. 8 shows also diagrammatically one embodiment of a transmitter for use in a system according to the invention.
Fig. 9 shows diagrammatically one embodiment of a receiver for use in a system according to the invention and Fig. 10 shows a circuit arrangement for use in the receiver shown in Fig. 9.

The introduction of the reference signals may, of course, be performed also in a different way. Fig. 8 shows a simplified embodiment of a transmitter used in a transmission system according to the invention in a block diagram, wherein a different method is used to introduce the reference signals. The corresponding parts of Figs. 3 and 8 are designated by the same reference numerals. In this embodiment the signals occurring at the outputs 3 and 4 are fed directly to the modulators 11 and 10 respectively. The output signal of the device 9 is modulated in two different modulators 24 and 25 on the auxiliary carriers from the devices 12 and 13. The output signals of these modulators may, for example, be supplied also to the adding device 16, as well as the output signals of the devices 6, 14 and 15.

Fig. 9 shows a simplified embodiment of a receiver in a block diagram, this receiver being suitable for the reception of signals emitted by a transmitter as described with reference to Figs. 3 and 8. Reference numeral 31 designates a suitable aerial system for the reception of the carrier modulated by the television signals. The aerial system 31 is coupled with a high-frequency amplifier 32 and a mixing stage 33, which comprises an oscillator suitable for this purpose. The output signal of the mixing stage 33 is fed to an intermediate-frequency amplifier 34, which is coupled with a detector 35 and a video amplifier 36.

The carrier, modulated by the sound signal, may be separated from the television signal in the intermediate-frequency stage 34 or in the detector 35, according as use is made or not made of the intercarrier-wave principle, and be supplied to an intermediate-frequency stage 41, which is coupled with a sound detector 42. The output signal of the detector 42 is fed via a low-frequency amplifier 43 to one or more loudspeakers 44. In Fig. 9 the sound carrier is shown separated from the television in the intermediate-frequency stage 34.

The synchronizing signals contained in the output signal of the video amplifier 36 are regained from this output signal in the separating circuit 37.

The synchronizing pulses for the vertical deflection are fed to the device 38 to synchronize the sawtooth generator forming part thereof; the output currents of 38 are fed to the vertical deflecting coils (not shown) of the various reproducing tubes.

The synchronizing pulses for horizontal deflection are fed to the device 39 to synchronize the sawtooth generator forming part thereof; the output currents from 39 are fed to the horizontal deflecting coils (not shown) of the reproducing tubes.

These devices 38 and 39 comprise moreover any required fly-wheel arrangements, whilst, moreover, from the device 39 a direct voltage may be obtained in known manner from the fly-back of the line sawtooth generator, which direct voltage may be used as a high tension for the picture tubes.

For the conventional gain control the fly-back pulses from the device 39 may be fed in known manner to a device 50, to which is also fed the output signal of the video amplifier 36. The device 50 comprises a gate circuit, which becomes conductive under the action of the said fly-back pulses only during the occurrence of the line- and frame-synchronizing pulses. The pulses at the output of the gate circuit, the amplitudes of which pulses are proportional to the corresponding peak values of the synchronizing pulses, are a measure for the level of the signal occurring at the output of the video amplifier 36. The pulses thus obtained may be fed via smoothing networks 51 and 52 as control-voltages to the high- and intermediate-frequency stages.

As has been stated, this control has the disadvantage that, indeed, only the low frequencies of the signal occurring at the output of the amplifier 36 are brought to the correct level, which does not apply to the frequencies lying in the range between $f_b$ and $f_c$ and between $f_g$ and $f_k$, i.e. those frequencies which relate to the colour information.

Figure 6:
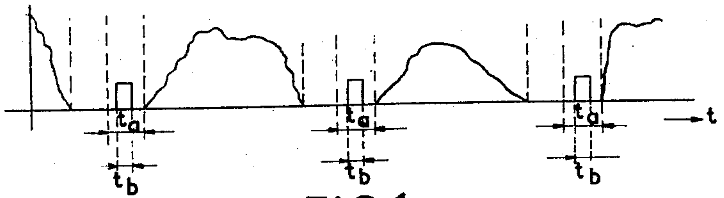
Figure 7:
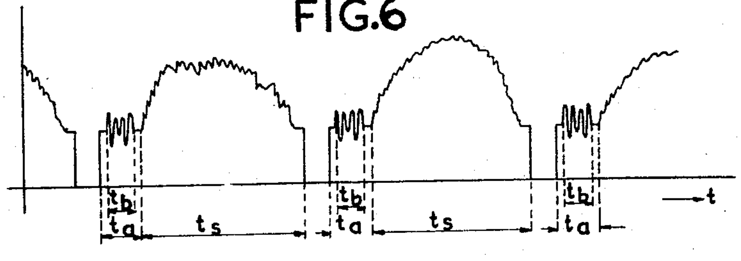

The output signal of the amplifier 36 is also fed to a bandpass filter 53 having a pass range between the frequencies $f_b$ and $f_c$ and to a bandpass filter 54, having a pass range between the frequencies $f_g$ and $f_k$. The output signals of the filters 53 and 54 are fed to the detectors 55 and 56 respectively, at the output of which occur, consequently, signals, the shape of which is shown in Fig. 6, these signals thus containing the reference signals occurring during the periods $t_b$.

The devices 55 and 56 are connected to video amplifiers 57 and 58. The output signals of the video amplifiers 36, 57 and 58 are fed to a device 59, which comprises suitable, known combination networks. At the outputs 61, 62 and 63 of the device 59 occur signals which relate to the red, green and blue components respectively of the scene to be reproduced. These signals may be supplied to the control-elements of reproducing tubes 64, 65 and 66, which reproduce these signals in red, green and blue light respectively. The signals may, of course, also be applied to the control elements of a single three-colour reproducing tube comprising three electron guns. If use is made of a three-colour reproducing tube comprising one electron gun, the signals must be applied to the control-element of this tube in a particular succession of time.

Any phase displacements of the various signals relative to one another have so far not been considered; these phase shifts may be compensated in known manner, for example with the aid of delay-lines.

Figure 10:
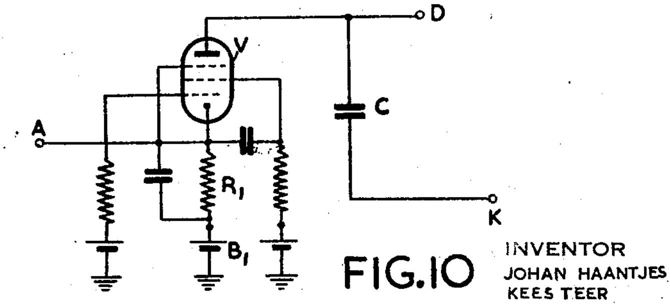

The output signals of the amplifiers 57 and 58 are fed to devices 70 and 71 respectively, both of which comprise a gate circuit and to which the output signals of a device 72 are supplied. For the sake of completeness it is stated that in the circuits between the detectors 55 and 56 on the one hand and the devices 70 and 71 on the other hand the direct current component must not get lost. This device 72 is a delaying network, which delays the fly-back pulses from the device 39 for such a period that these pulses coincide in time with the reference pulses contained in the output signals of the amplifiers 57 and 58. An example of such a gate circuit is shown separately in Fig. 10. The video signals from an amplifier 57 or 58 are fed via the terminal A to a cathode resistor $R_1$ of a tube V; this cathode resistor is connected on the side remote from the cathode to the positive terminal of a battery $B_1$. The anode of the tube V is connected via a decoupling capacitor C through the terminal K to the device 72, which thus furnishes the fly-back pulses from the device 39, coinciding in time with the reference signals contained in the signal applied to the terminal A. The voltage of the battery $B_1$ is chosen to be so high that the tube V does not become conductive under the action of the signal applied to the terminal A alone. It does become conductive, if the said delayed fly-back pulses occur at the anode, these pulses having a suitably chosen high voltage. This means that at the terminal D, during the occurrence of these fly-back pulses, also are produced pulsatory signals, the amplitude of which is determined by the amplitude of the reference signals occurring at the input terminal A. By smoothing the pulses occurring at the terminal D a control-voltage is obtained, the value of which is determined by the level of the signals occurring at the output of the amplifier 57 or 58. The control-voltage occurring at the output of the device 70, which thus comprises a gate circuit, is fed via the smoothing network 73 to the amplifier 57, the amplification factor of which is controlled in accordance with the control-voltage concerned in a manner similar to that of the aforesaid conventional gain control, so that at an increasing value of the level of the signal occurring at the output of the amplifier 57 the amplification factor of this amplifier decreases.

The output signal of the device 71 is fed via a smoothing network 74 to an amplifier 58, so that also the amplification factor of this amplifier is controlled in accordance with the control-voltage concerned.

In the foregoing it is always assumed that the reference signals associated with the signals modulated on the auxiliary carriers coincide in time. It will be obvious that this is not necessary. Then the two devices 70 and 71 must be connected via separate networks 72 having different delay times, to the device 39.

It should be noted here that with respect to the fact that the detector circuits 55 and 56 are based on the conventional rectifier principle, the frequency of the auxiliary carrier on which the colour signal is modulated and the frequency of the associated reference signal need not be equal. In view of the purpose of the introduction of the reference signals the difference between these two frequencies must, of course, not be high.

As an example of a system according to the invention, reference is made to a system in which a signal of large bandwidth is transmitted continuously, whilst two other signals of smaller bandwidth, modulated on the same auxiliary carrier, are transmitted alternately. It will be obvious that in this case only one reference signal may suffice.

It should be noted that a control-voltage from the device 70 or 71 may at the same time be used effectively for controlling the level of the sound signal. Use is preferably made to this end of the control-voltage derived from the reference signal which relates to the auxiliary carrier, of which the frequency is nearest the sound carrier.

What is claimed is:

1. A transmission system for line-scanned television signals, comprising sources of three color television signals, a main carrier wave modulated by one of said color television signals, a source of line synchronizing pulses, each of said line synchronizing pulses having a back porch associated therewith, a source of at least two auxiliary carrier waves of different frequencies and each modulated by a different one of the remaining two of said three color television signals, means for generating a plurality of reference signals respectively associated with each of said auxiliary carrier waves and occurring only during the occurrence of said back porches of the line synchronizing pulses, said reference signals each having a constant amplitude and each having a frequency substantially the same as that of the corresponding auxiliary carrier wave, means for combining and transmitting said modulated carrier waves, said line synchronizing pulses and said reference signals, receiver means for receiving said transmitted signals and comprising means for separating the color signals modulated on said auxiliary carrier waves from the received signals, a plurality of control means connected for respectively controlling the amplitudes of said separated signals in accordance with the amplitudes of the respective reference signals, means for separating the signal modulated on said main carrier wave from the received signals, color picture display means, and means for applying the three said separated signals to said color picture display means.

2. A system as claimed in claim 1, in which said reference signals coincide with respect to time.

3. A system as claimed in claim 1, in which said receiver means include means for producing a control pulse during each time of occurrence of said back porches, and a plurality of gate circuits respectively connected to said control means and responsive to said control pulses for causing said reference signals to actuate said control means.

References Cited in the file of this patent

UNITED STATES PATENTS

| | | |
|---|---|---|
| 2,635,140 | Dome | Apr. 14, 1953 |
| 2,757,229 | Larkey | July 31, 1956 |